United States Patent [19]

Baranyai et al.

[11] Patent Number: 4,499,577

[45] Date of Patent: Feb. 12, 1985

[54] LINEAR TIME DIVISION MULTIPLEXED CONFERENCER FOR DATA TRANSFER APPLICATIONS

[75] Inventors: Lawrence Baranyai, Holmdel; John R. Colton, Freehold, both of N.J.

[73] Assignee: AT&T Bell Laboratories, Murray Hill, N.J.

[21] Appl. No.: 434,822

[22] Filed: Oct. 18, 1982

[51] Int. Cl.³ .................. H04Q 11/04; H04M 3/56
[52] U.S. Cl. ................................. 370/62; 179/18 BC
[58] Field of Search .................... 370/62; 179/18 BC

[56] References Cited

U.S. PATENT DOCUMENTS

| | | | |
|---|---|---|---|
| 4,069,399 | 1/1978 | Barrett et al. | 370/62 |
| 4,119,807 | 10/1978 | Nahay | 179/18 BC |
| 4,190,742 | 2/1980 | Southard | 370/62 |
| 4,190,744 | 2/1980 | Frank | 370/62 |
| 4,268,722 | 5/1981 | Little et al. | 370/62 |
| 4,293,946 | 10/1981 | Kuras et al. | 370/62 |
| 4,295,008 | 10/1981 | Johnson et al. | 179/18 BC |
| 4,298,977 | 11/1981 | Abbott et al. | 370/62 |
| 4,307,462 | 12/1981 | Mazzocchi | 370/2 |
| 4,340,960 | 7/1982 | Moran | 370/62 |
| 4,389,720 | 6/1983 | Baxter et al. | 370/62 |

Primary Examiner—Douglas W. Olms
Assistant Examiner—Kenneth I. Rokoff
Attorney, Agent, or Firm—Fred B. Luludis

[57] ABSTRACT

There is disclosed a general purpose linear time division multiplexed conference system for continuously summing and supplying digital message samples arriving in time slots within a frame. The conference system integrates both voice and data network conference connections and provides total isolation between the secondary legs of a data network connection. The host computer of a data conference connection is assigned to the lowest ordered time slot relative to the time slots assigned to secondary legs of the data conference connection. The summation of data samples accumulated from each leg of the data conference connection during a write cycle is modified during a next supply cycle after distribution to the host computer but prior to distribution to secondary legs. Modification is achieved by overwriting the summation with the data sample received from the host computer during the prior write cycle.

18 Claims, 7 Drawing Figures

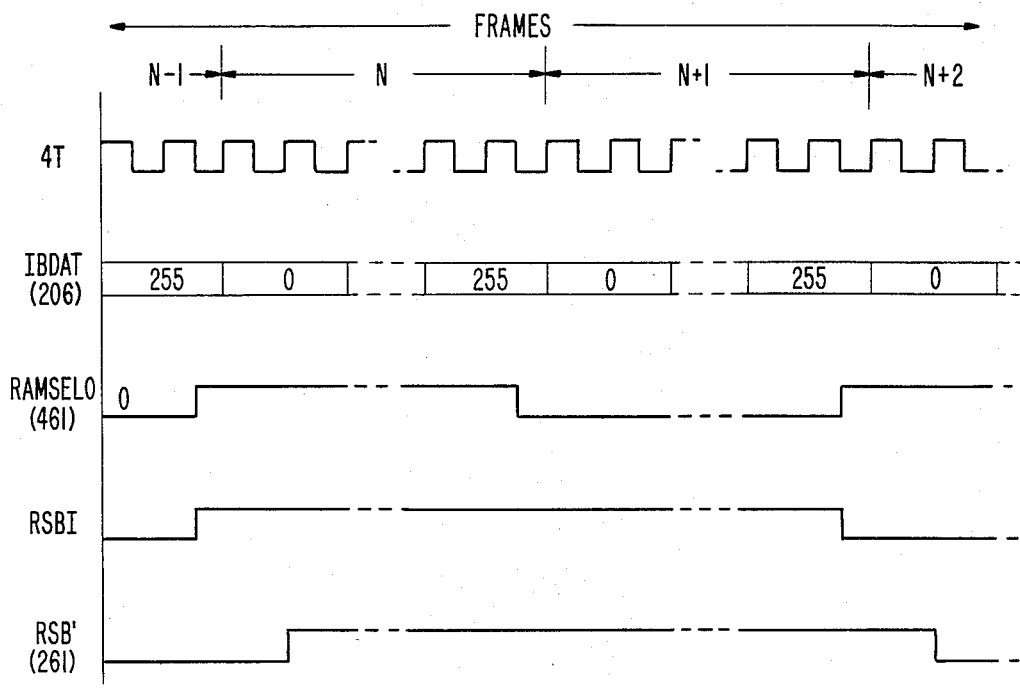

LINEAR TIME DIVISION MULTIPLEXED CONFERENCER FOR DATA TRANSFER APPLICATIONS

TECHNICAL FIELD

This invention relates to digital conferencing of time division multiplexed (TDM) linear voice and data samples and, more particularly, to a digital network for establishing broadcast polling multipoint connections.

BACKGROUND OF THE INVENTION

Time division multiplexing is a type of digital switching in which a line is time shared among multiple users, and in which multiplexed time slots are allocated for establishing communication sessions.

The art of digital time division switching also includes systems known as Time Slot Interchangers (TSI), in which digital message samples from a given input time slot are switched to an alternate output time slot. TSI is now used to establish conference connections.

U.S. Pat. No. 4,119,807; entitled "Digital Time Division Multiplex Switching System" and issued Oct. 10, 1978; is an example of a time shared digital switch arranged to establish conference connections without restriction as to the number of conferees that may participate in a conference session. This patent discloses an arrangement for sequentially summing digital message samples from 128 lines connected respective to 128 time slots during a first time frame and outputting the summed samples to each line of the connection, respective to its assigned time slot, during a second time frame.

A digital switching arrangement of this type uses two summation memories, which are alternately loaded and unloaded respective to a time frame. In addition, third and fourth memories are alternately loaded in step with the summation memories, and are used for the storage of digital message samples respective to assigned time slots. Each summation memory is cleared at the beginning of its respective storage cycle or time frame in preparation for the storage of a new series of summed message samples.

Currently, broadcast polling multipoint connections consisting of a master station and one or more remote stations are typically established using analog conference bridges. The master station or host broadcasts polling information to the secondary legs of the multipoint or conference connection and transmissions from the secondary legs are received only by the host station.

In a typical operation, requiring 4-wire channels, the host station polls each secondary leg by transmitting a unique address recognized by the polled station. If the polled station has no business to transact with the host it returns a negative or no response and the host station polls another remote station. If the polled station has business to transact with the host, the polled station returns a positive response and the transaction is completed before the host polls another station. All data transactions between remote stations are made through the host station, since typically, the multipoint conference network is designed to isolate remote stations from each other. This requirement is necessary to prevent data from a polled station or noise from an unpolled station from confusing other remote stations.

Presently, broadcast polling multipoint connections are typically established using 4-wire circuits having an analog bridge in the transmit and receive paths. In addition, each remote station is connected to the receive bridge via an amplifier circuit having forward but no reverse gain to isolate remote stations from each other.

The data conference connection described above is not only expensive to construct but is expensive to maintain. Analog circuits, especially amplifiers, require scheduled maintenance to adjust the gain of the amplifiers, which drift over a period of time, and to prevent cross-talk between the channels. Also, each conference network must be specially engineered to meet user requirements as to the number of conferees that will be connected to the network. A specially engineered conference network is an expensive undertaking.

Most prior digital conferencing systems, including U.S. Pat. No. 4,119,807, process digital voice samples and therefore have the capability to store and forward digital data. However, a significant shortcoming inherent in such systems is the inability to properly process or control data streams passing between a conference consisting of a host computer and secondary computers, such as a broadcast polling multipoint connection. In prior art systems data transmitted from a polled computer to the host computer is also forwarded to other computers in the conference network since data or noise samples from each station in the network are summed and stored during a read cycle and supplied to each station (time slot) during a supply cycle. Therefore, data not only passes between the polled computer and host computer but also passes to non-polled computers. Also, the last data stream from a priorly polled computer may be summed with a command from the host computer to a newly polled computer thereby corrupting the command. Since the command is embedded in a summed data stream it may be unrecognizable by the newly polled computer. Consequently, the newly polled station may disregard the command and remain idle.

In essence, prior art digital conferencing systems lack the ability to isolate secondary stations from each other and also lack the ability to integrate both voice and data connections.

SUMMARY OF THE INVENTION

The problems and inadequacies inherent in prior art systems discussed above have been obviated by the general purpose digital conferencing system disclosed herein.

It is an object of our invention to integrate both voice and data connections and to isolate polled and non-polled terminals from each other without requiring analog bridges or amplifiers. To achieve isolation, the system readjusts incoming time slot assignments by way of a time slot interchanger to insure that the host terminal of a data connection is assigned to the lowest ordered time slot relative to the time slots assigned to secondary terminals of the data connection. Interchanged time slots are restored to their original time slot assignments at the output by way of an output time slot interchanger. In this manner, the host terminal is recognized as the first access to conference summed message samples during each supply cycle.

Upon recognizing a first access to the conference summation, the general purpose digital conferencing system distributes the summation to the respective time slot (host terminal) and substitutes that time slot's message sample, received during a previous read cycle or frame, for the summation stored in an accumulator memory. Thereafter, during the same supply frame, each succeeding time slot (secondary leg) assigned to the data connection receives the modified conference summation or broadcast transmitted by the host terminal.

The general purpose digital conferencing system also controls the transmission (broadcast) and receiving (monitor) aspects of each time slot. Thus, the system can readily mix both voice and multipoint data connections, which is a further object of our invention and an advancement over the prior art.

BRIEF DESCRIPTION OF THE DRAWING

The operation and implementation of the present invention will be more fully apparent from the following description of the drawing, in which:

FIG. 5 is a time representative sequence diagram depicting the manner in which a reset signal is generated;

FIG. 6 shows the manner in which FIGS. 2 and 3 should be arranged; and

FIG. 7 is an illustration, respective to a cited example, of the manner in which a group of time slots are assigned to an accumulator RAM memory location.

GENERAL DESCRIPTION

Figure 1:
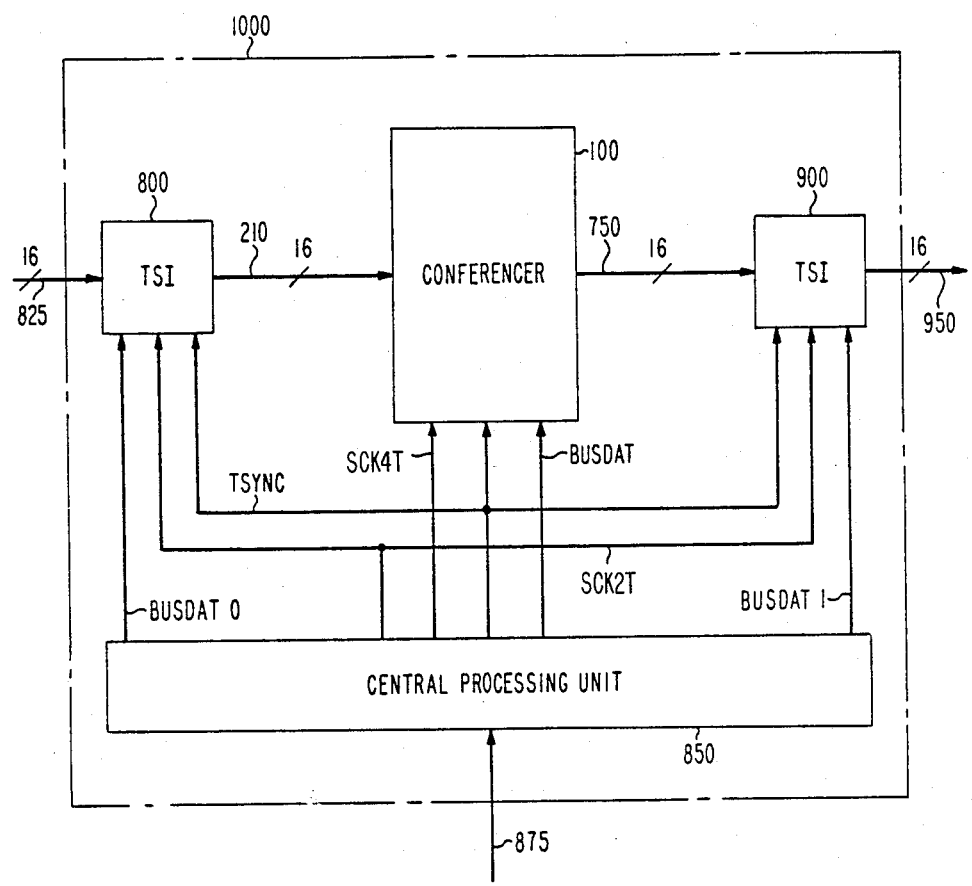
FIG. 1 illustrates one embodiment of the invention in block diagram form.

A brief overview of the conferencing system will now be given with respect to FIG. 1 which shows an example of a broadcast polling multipoint conferencing system 1000 which integrates both voice and data connections. Conferencing system 1000 consisting of time slot interchangers 800 and 900, general purpose linear time division multiplexed conferencer 100 and central processing unit 850 extends linear encoded voice and data samples from input terminal 825 to output terminal 950. Conferencing system 1000 can be, typically, interposed between time division multiplexed transmission channels, such as the Bell System's well known "T1" carrier system, which is a time division multiplexing switching system.

In a digital broadcast polling multipoint connection originating from a T1 carrier channel there is no guarantee that a host terminal time slot will be the earliest in time sequence relative to secondary terminal time slots. This is especially true considering that a typical multipoint connection can originate from different T1 carrier channels. To obviate this problem, T1 carrier channel time slot assignments connecting to system 1000 respective to a data multipoint connection are analyzed by central processing unit 850 to determine the relative time positions of the conferenced time slots. In the event a host computer is not assigned to a lowest ordered relative time slot, then central processing unit 850 directs time slot interchanger (TSI) 800 via lead BUS-DAT0 to interchange that time slot with an alternate time slot that is first in time sequence during each time slot frame respective to the occurrence of the time slots assigned to the secondary legs of the multipoint connection. Central processing unit 850 will rearrange all times slots, if necessary, via TSI 800 to guarantee a low ordered relative time slot assignment to a host computer.

In turn, central processing unit directs TSI 900 via lead BUSDAT1 to restore each interchanged time slot to its original assignment. In this manner, the system is made transparent when interposed between time division multiplexed transmission channels.

General purpose conferencer 100 ensures that the secondary legs of a data multipoint connection are totally isolated from each other. General purpose conferencer 100 is a linear time division 256 time slot switch having the capability of processing both voice and data connections. To achieve isolation conferencer 100 controls the transmission (broadcast) and receiving (monitor) aspects of each time slot.

Conferencer 100 sums linearly encoded voice or data samples outputted by TSI 800 via IDAT bus 210 and, as will be discussed, passes these summed samples for storage in accumulator RAM 510 (520) respective to time slots of the same conference connection during a write cycle. Thereafter, during a next supply cycle, conferencer 100 supplies to each time slot of the conference connection via TSI 900 the priorly summed message samples less the contribution made to the summation by the receiving time slot. For multipoint data connections, the supply cycle is modified by conferencer 100 in order to recognize the first access to the summed message samples respective to the data connection.

Since the backbone leg or host computer of multipoint data connection is assigned to the lowest ordered time slot it is the first time slot to access the data summation during each supply cycle. Upon recognizing a first access to the data summation conferencer 100 distributes the summation to the host computer via TSI 900 and overwrites the summation stored in accumulator RAM 510 (520) using the data sample received from the host during a previous write or storage cycle. Thereafter, during the same supply cycle, conferencer 100 distributes to each secondary leg or secondary time slot of the connection the data message sample received from the host computer. In this manner, each secondary leg of a multipoint data connection receives only transmissions or broadcasts from the host and therefore is isolated from the remaining secondary legs.

As will be discussed, central processing unit 850 communicates serially with conferencer 100 and TSI 800, 900 via respective BUSDAT leads.

DETAILED DESCRIPTION

As shown in FIG. 1, TSI 800, 900 are, typically, linear time division time slot interchangers in which 256 incoming time slots are transported to 256 outgoing time slots. TSI 800, 900 can be, typically, the type of time slot interchanger disclosed in U.S. Pat. No. 4,298,977 issued to R. P. Abbott et al on Nov. 3, 1981, in which, during a first or write cycle, a message or data sample respective to an incoming time slot is stored in an accumulator RAM (not shown) memory location respective to an assigned outgoing time slot. During a second or supply cycle, the stored message sample is removed from the accumulator RAM and outputted during the interchanged or transported time slot. In the case of TSI 800 (900) message samples are outputted respective to each time slot via 16 parallel bit bus 210 (950), TSI 800 (900) typically uses two 256 word by 16 bit per word data RAMS which are alternately cycled each time slot frame. In this manner, during a first time slot frame, TSI 800 (900) stores message samples respective to incoming time slots accepted via bus 825 (750) in a first data RAM (not shown) in memory locations respective to sequential time slot addresses. Concurrently, TSI 800 (900) supplies to an output bus 210 (925) message samples stored in a second data RAM (not shown) during a previous write cycle. During a next cycle the data RAMs are reversed in which the second data RAM is used to store incoming message samples and the first data RAM is used to supply message samples to an output.

In order interchange time slots, TSI 800 (900) uses a 256 by 11 bit control RAM (not shown) for the storage of the interchanged time slot address. For example, to interchange incoming time slot 5 with outgoing time slot 63 via bus 210, central processing unit 850 serially transmits via bus instructions to TSI 800 to load indirect address 63 into location 5 of TSI 800 control RAM and indirect address 5 into location 63. During incoming time slot 5 TSI 800 loads the respective message into location 5 of the data RAM in the storage cycle. Also the incoming message sample respective to time slot 63 is stored in sequential location 63 of the data RAM in the storage cycle. During the next supply cycle, the data RAM designated for supplying stored messages to output bus 210 is addressed respective to time slots 5 and 63. When time slot 5 occurs during the supply cycle its address is used to sequentially address the control RAM for fetching the supply RAM read address, which in this example is indirect address 63. Location 63 of the data supply RAM is addressed and the message sample stored in that location is supplied to the output at 210.

In a like manner, when time slot 63 occurs location 5 of the supply RAM is addressed and the message sample stored in that location is supplied to the output at 210. Thus, message samples respective to time slots 5 and 63 inputted at 825 are interchanged at the output of TSI 800 at 210.

Continuing the example, time slot 63 and 5 are again interchanged at system 1000 output 950 to restore the message samples to their original time slot positions. As in the case of TSI 800, central processing unit 850 instructs TSI 900 via BUSDAT1 to load address 5 in location 63 of the TSI 900 control RAM (not shown) and to load address 63 in location 5, and in the manner described above for TSI 800. Message samples to TSI 900 via bus 750 respective to interchanged time slot 5 are outputted at 950 during original time slot 63. Message samples accepted by TSI 900 respective to interchanged time slot 63 are outputted during the occurrence of original time slot 5.

To synchronize system 1000 to the occurrence of a time slot frame central processing unit distributes a frame pulse to conferencer 100 and TSI 800 (400) via lead TSYNC every 125 μsec. Central processing unit 850 also transmits to conferencer 100 a four megahertz clock signal via lead SCK4T and a two megahertz clock signal to TSI 800 (900) via lead SCK2T for generating a stream of 256 time slots respective to a frame pulse. As will be discussed shortly, conferencer 100 divides the four megahertz clock by two to be in step with TSI 800 (900).

Central processing unit 850 typically includes a microprocessor in combination with sufficient memory, such as ROMs and RAMs, an internal bus, a microprocessor bus interface, a clock means for communicating with an external terminal via bus 875, a system synchronizer, and a peripheral bus interface for communicating with the elements of system 1000.

Central processing unit 850 is used to interface conferencer 1000 with a remote or local data terminal (not shown) in order to establish voice or data conference connections. Most large corporations having diverse locations have a need for a multipoint connection for the transmission of data between a central location and one or more remote locations. The end points (stations) are routed to conferencing system 1000 via a transmission link such as the Bell System's "T1" carrier. A craftsperson instructs central processing unit 850 via a data terminal as to the "T1" carrier time slots assigned to the central or host station and to the secondary stations.

Central processing unit 850 is programmed to analyze the instructions, and if required, interchange via TSI 800, in the manner described above, the host time slot to ensure that that time slot occurs first within a frame relative to the time slots assigned to the secondary legs at the input to conferencer 100. As discussed above, central processing unit 850 is also programmed in the well known manner to instruct TSI 900 via BUSDAT1 to restore all interchanged time slots to their original assignments at output 950.

Central processing unit 850 is further programmed in a well known manner to instruct conferencer 100 to establish a conference connection between the stations of a multipoint connection. The manner in which central processing unit 850 instructs conferencer 100 to establish a conference connection is discussed in the following sections.

GENERAL PURPOSE CONFERENCER (100) OPERATION

Figure 2:
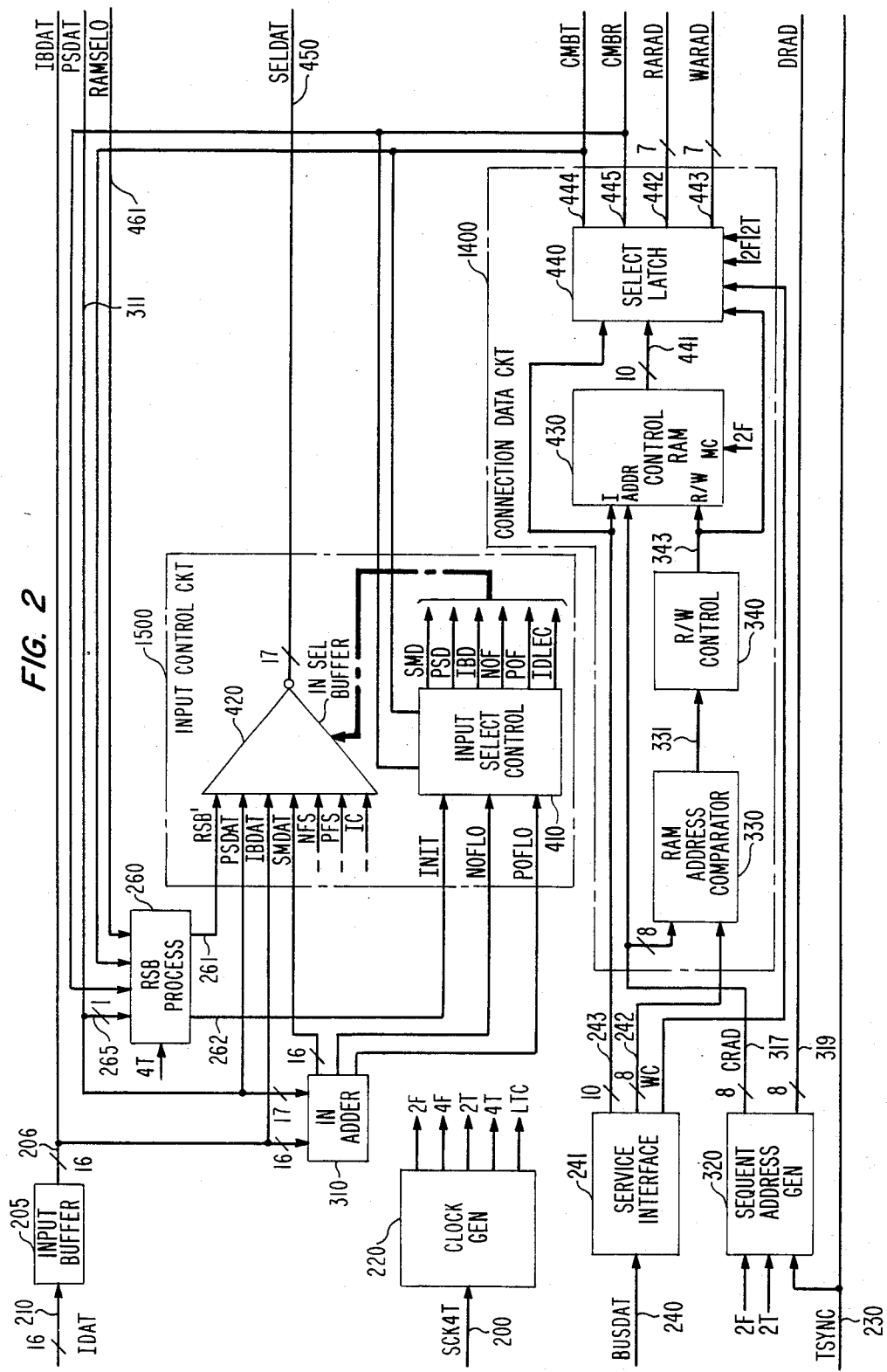
FIGS. 2 and 3 show a detailed block diagram of a preferred embodiment of the invention.
Figure 3:
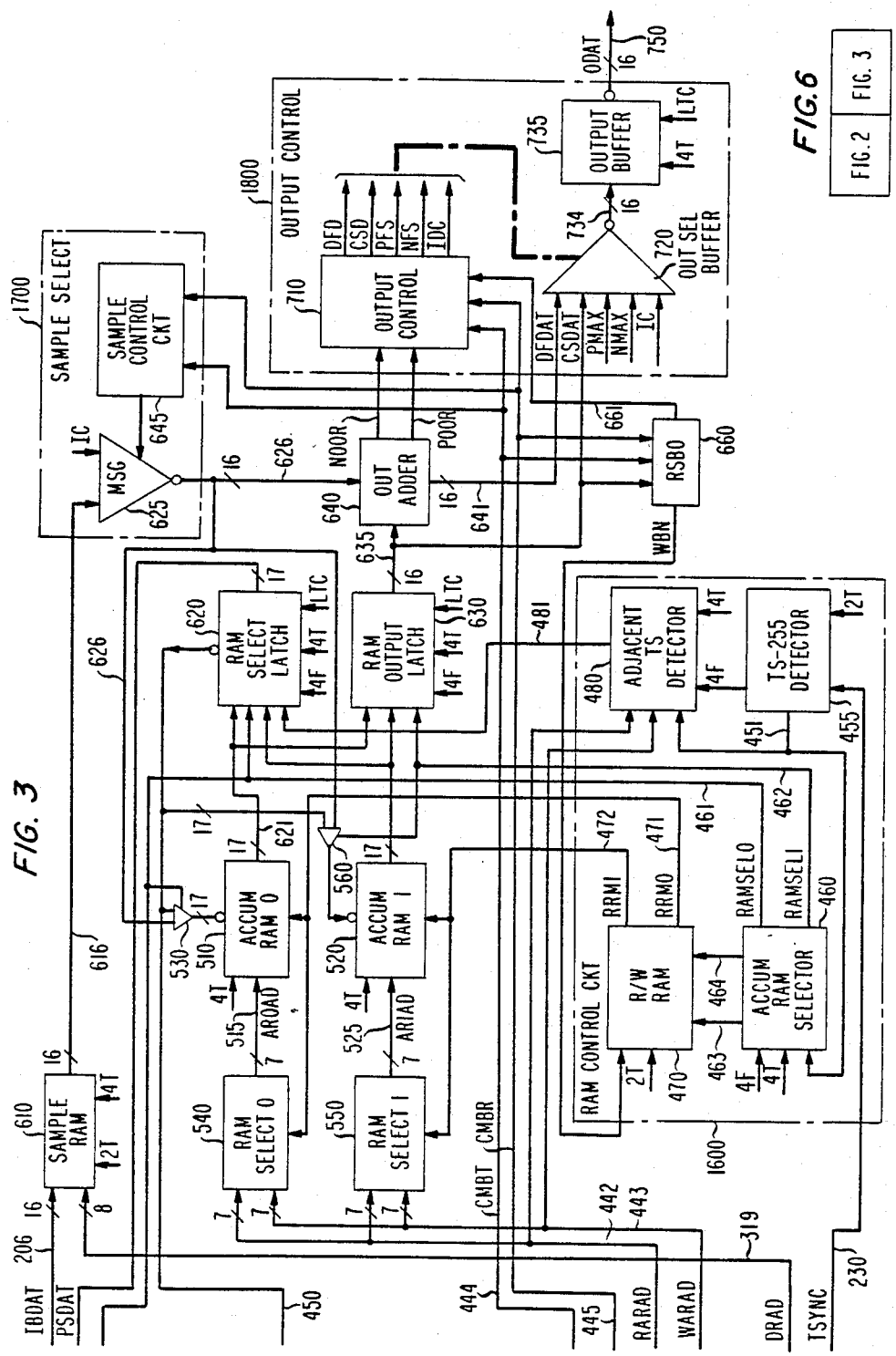

Drawing FIGS. 2 and 3, when arranged with respect to each other as shown in FIG. 6, illustrate how the various elements of conferencer 100 cooperate to provide a linear time division multiplexed conferencing network.

Referring to FIGS. 2 and 3, a digital input time frame having n time slots from TSI 800 suplies at input 210 (FIG. 2) a parallel input of linearly encoded data or voice samples in two's complement format for processing by conferencer 100. Thereafter, in accordance with an assigned connection mode, a time slot assigned to a connection is extended to TSI 900 via output data bus 750 (FIG. 3).

A time frame is typically the 125 microsecond Bell System T1 carrier frame, and herein a time frame will be assumed to be 125 microseconds represented by a frame sync signal (TSYNC of FIG. 4) externally supplied via lead 230 (FIG. 2) from central processing unit 850. Central processing unit 850 also supplies a 4.096 megahertz clock signal (SCK4T) to clock generator 220 via lead 200 and outputted via lead 4T for operating the input and output conferencer 100 paths synchronously with one clock signl and for division into a 2 MHz clock signal 2T (FIG. 4) outputted via lead 2T. Clock generator 220 also supplies a second 2 MHz clock signal 2F (FIG. 4) outputted via lead 2F which is an inverted non-overlapping replica of signal 2T, and a second 4 MHz clock signal 4F outputted via lead 4F which is an inverted non-overlapping replica of clock signal 4T. Clock generator 220 further supplies a third 2 MHz clock signal LTC outputted via lead LTC having a logic one state which overlaps the last quarter and first quarter of adjacent time slots to form a clock window. Clock signal LTC enables, during the window, new data to be set up on the "D" inputs to latch circuits 620, 630 and 735 (FIG. 3) in order to update the respective latch on the next rising edge of clock signal 4T occurring within the LTC window, as will be discussed.

ADDRESS COUNTER

Sequential address generator 320 (FIG. 2) in response to the falling edge of clock signal 2T generates an eight bit time slot address (CRAD), representing time slots 0 through 255, for addressing control RAM 430 over address bus 317. In response to the rising edge of clock signal 2T, address generator 320 generates time slot addresses (DRAD) 0 through 255 for addressing sample memory 610 (FIG. 3). TSYNC supplied by central processing unit 850 is the means in which the counters are synchronized with respect to incoming time slots (IBDAT).

Figure 4:
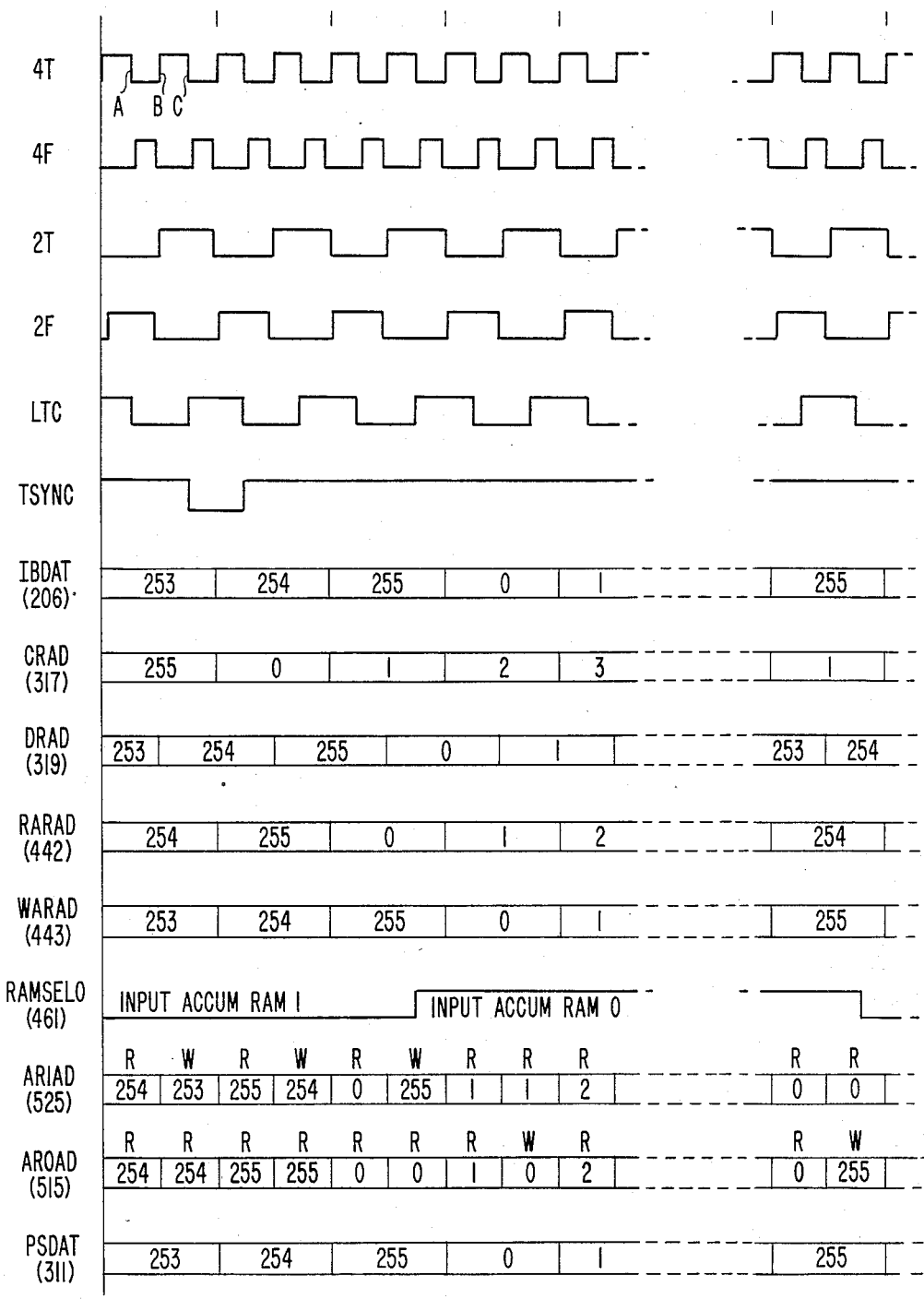
FIG. 4 is a time representative sequence diagram of various clock signals, control signals and time slot addresses with respect to a master clock signal.

Briefly referring to FIG. 4, there is shown a timing representation of time slot addresses CRAD and DRAD in which time slot address DRAD leads (starts before) incoming time slot associated with input data bus IBDAT by one-half time slot and time slot address CRAD leads incoming time slot IBDAT by two time slots. This sequence permits prefetching message samples from sample RAM 610 and accumulator RAM 510 (520) as will become more apparent further on in the detailed description.

CONTROL RAM

Returning to FIG. 2, control RAM 430 has 256 memory locations respective to incoming time slots. Time slot addresses (CRAD) sequentially generated by address generator 320 are extended to the address input of control RAM 430 over address bus 317. Control RAM 430 is the means by which selected incoming time slots from input buffer 205 are connected to output time slots at output 750. In this respect, each time slot participating in a conference or multipoint connection is assigned (externally) the same memory location in accumulator RAM 510, or in accumulator RAM 520 (FIG. 3). The accumulator RAM 510 (520) memory location address assigned to a connection, mode control bits CMBT and CMBR, plus a parity bit are stored in control RAM 430 (FIG. 2) for each respective time slot of a conference connection.

The correspondence between time slot addresses and accumulator RAM 510, 520 memory locations is made external to the conferencer by central processing unit 850 (FIG. 1). For example, assume that a two party call is comprised of time slots 8 and 15 respectively, and further assume that accumulator RAM 510 (520) memory location address 20 is assigned to the connection. To control the processing of the connection by the conferencer, a seven bit binary representation of address 20, plus two mode control bits, plus a parity bit is stored in memory location 8 and memory location 15 of control RAM 430.

External central processing unit 850 serially transmits the connection control data, plus time slot address to service interface circuit 241 via BUSDAT lead 240 under the control of a bus synchronization pulse (not shown). Interface circuit 241 is a latched serial-to-parallel converter circuit, which extends the time slot address to address comparator circuit 330 via bus 242 and extends connection control data to control RAM 430 via bus 243.

Interface circuit 241 also includes a decoder circuit for decoding a multibit operation code appended to connection data received via lead 240. The operation code specifies whether the data sent via lead 240 is to be stored in control RAM 430 (new connection data) or is to be used for auditing or maintenance purposes (maintenance data, not shown). Service interface circuit 241 upon decoding an operation code that specifies a write to control RAM 430 changes the logic state of the wc lead to select latch 440 from a logic zero to a logic one. The logic one state extends new conference information to processing circuitry while the respective control RAM 430 memory location is being updated, as will be discussed shortly.

Address comparator circuit 330 compares the time slot address on bus 242 against time slot address CRAD (Control RAM Address) contained on bus 317. When the time slot addresses on bus 242 and bus 317 compare, address comparator 330 causes R/W control circuit 340 via lead 331 to switch control RAM 430 from the read state to the write state via lead 343. On the falling edge of clock pulse 2F the connection control data on bus 243 is caused to be written into control RAM 430 respective to the time slot address on address bus 317.

With respect to the above example, in which time slots 8 and 15 were assigned accumulator RAM 510 (520) memory location 20, external central processing unit 850 establishes connection control as follows: first, time slot address 8 and accumulator RAM 510 (520) address 20, together with the mode control bits and a parity bit are serially transmitted by processor 850 over lead 240 (BUSDAT) for acceptance by interface circuit 241. Interface circuit 241 converts the data to a first parallel output on bus 242 (time slot address) and a second parallel output on bus 243 (accumulator RAM address 20, mode bits plus parity); second, when address counter 320 generates time slot address 8, the R/W control circuit 340 in response to comparator circuit 330 causes the connection control data on bus 243 to be written into address 8 of control RAM 430 on the falling edge of the 2F pulse; third, the same procedure is then executed for time slot 15 completing the sequence for establishing conference connection data for the connection.

As discussed above, the connection control data stored in control RAM 430 for each time slot of a connection includes: the address of a location in accumulator RAM 510 (520) assigned to the connection; two mode control bits and a parity bit. In the illustrative embodiment disclosed herein, it is assumed that the two mode control bits, CMBT and CMBR, are in accordance with the following table definitions:

TABLE 1

| CMBR | CMBT | FUNCTION |
| --- | --- | --- |
| 0 | 0 | Data Connection |
| 0 | 1 | Broadcast Connection |
| 1 | 0 | Monitor Connection |
| 1 | 1 | Conference Connection |

In accordance with the definitions described by Table 1, mode control bit CMBT set to the logic one state declares a broadcast or transmit connection in which a time slot has permission to transmit messages to a conference connection. Mode control bit CMBR set to the logic one state declares a monitor or receive connection in which a time slot has permission to receive messages from a conference connection.

A single mode control bit set to logic zero prevents a time slot from having access to the respective function. For example, if the state of the mode control bits is 01 for a respective time slot, then that time slot can only broadcast to the remainder of the connection. When both mode control bits are set to logic one (11) a respective time slot has permission to both broadcast and receive messages from the connections. Both mode control bits set to zero defaults to a data connection mode and will be processed accordingly as will be discussed shortly.

Returning to FIGS. 2 and 3, control memory RAM 430 is normally held in the read state by the R/W control circuit 340 via lead 343. Sequential time slot addresses (CRAD) for accessing respective locations of control RAM 430 are generated by address generator 320 in response to each falling edge of the 2T clock signal and are outputted via bus 317.

On the falling edge of the 2F clock signal, the eight bit time slot address (CRAD) applied to the address input of control RAM 430 via bus 317 is internally latched by control RAM 430 and a memory location represented by time slot address CRAD is read. The contents are latched into control RAM 430 output latch (internal) on the following rising edge of 2F (not shown). The connection control data respective to a time slot is passed from control RAM 430 to select latch circuit 440 via data bus 441.

SELECT LATCH

Select latch 440 is a selector followed by a two stage dynamic register of D-type flip-flops and includes a ten bit selector for selecting data from either data bus 343 or data bus 441. During normal processing select latch 440 accepts data from bus 441. Otherwise, data is accepted from bus 243 upon initialization of a time slot via service interface circuit 241.

As discussed above, during initialization of a time slot the decoder circuit of service interface circuit 241 causes the wc lead connected to select latch 40 to go to a logic one state indicating a write to control RAM 430. Also, a comparison of address CRAD and the address of the initialized time slot address on bus 242 forces lead 343 from R/W control 340 to a logic zero state. The coincidence of a logic one state on the wc lead and a logic zero state on lead 343, both of which connect select latch 440, is reclocked by select latch 440 on the next rising edge of the 2F clock forming a window to allow select latch 440 to select data from bus 243. The new connection data on bus 243 comprises a seven bit accumulator RAM address and two mode bits (and parity). Select latch 440 extends the accumulator RAM address to RARAD address bus 442 and extends both the accumulator RAM address and mode bits (and parity) to the first stage of the two stage dynamic register 440. The data is clocked into the first stage of the two stage dynamic register 440 on the rising edge of the 2T clock, which occurs during the middle of the respective time slot. Thereafter the ten bits of connection data is clocked into the second stage of the two-stage dynamic register 440 on the rising edge of the 2F clock.

In this manner, new connection data respective to an initialized time slot assigned to a connection is stored in control RAM 430, and simultaneously therewith, is accepted by select latch 440 for immediate use by the conferencer. Otherwise, the conferencer's access to the new connection data would be delayed one time frame.

For processing message samples, select latch 440 holds in its second or output register the accumulator RAM 510 (520) connection write address (WARAD) on bus 443 and mode control bits on leads 444 and 445 respective to a particular time slot and, simultaneously therewith, holds accumulator RAM 510 (520) connection read address (RARAD), outputted from control RAM 430 via bus 441, on bus 442 respective to a next time slot. Using this approach, a summed message sample respective to a second time slot is prefetched prior to storing a summed message sample respective to a first time slot in accumulator RAM 510 (520).

The accumulator RAM 510 (520) address portion of the connection control data presented to select latch 440 via bus 441 is first outputted by select latch 440 as accumulator RAM 510 (520) read address (RARAD) on bus 442. Thereafter, on the rising edge of clock signal 2F the connection control data outputted from control RAM 430 via bus 441 is clocked into select latch 440 and held in the second register stage of select latch 440. The connection control data is then outputted by the second register stage of select latch 440 as an accumulator RAM 510 (520) write address (WARAD) on bus 443. Mode control bits, CMBT and CMBR, are outputted on leads 444 and 445 respectively.

INPUT SELECT BUFFER

Input select buffer 420 (FIG. 2) is a combinational gate circuit for checking parity (not shown) and for selecting, under control of input control circuit 410, one of a multiple of alternate digital words for storage in accumulator RAM 510 (520). Inputs PSDAT, IBDAT and SMDAT are defined, respectively, as previously summed message samples removed from accumulator RAM 510 (520); inputted message sample at 206 respective to an incoming time slot; and the sum of PSDAT and IBDAT generated by in-adder 310. Alternate digital messages PFS, NFS and IDLECODE (IC) are fixed codes that are hard wired internally at input select buffer 420 and are selected at the direction of input selector control 410 for storage in accumulator RAM 510 (520). PFS is a digital two's complement representation of the maximum positive value including sign of a summed message sample, NFS is a digital two's complement representation of the maximum negative value including sign of a summed message sample, and IDLECODE (IC) represents a two's complement digital message sample of zero value.

Input select buffer 420 also includes combinatorial logic circuitry for appending (upon initialization) or changing the state of bit 16 (reset bit) of outputted data to SELDAT bus 450 for storage in accumulator RAM 510 (520). The function of the reset bit RSB' will be detailed further on in this description.

IN-ADDER

In-adder 310 is a two's complement combinatorial circuit adder for summing incoming message samples (IBDAT) inputted via bus 206 with accumulator RAM 510 (520) previously summed message samples (PSDAT) outputted from select latch 620 via PSDAT bus 311 to in-adder 310. In-adder 310 includes combinational saturation logic circuitry for checking a summation for positive or negative overflow in the well-known manner, and includes combinational circuitry for performing circuit maintenance functions (not shown) at the direction of an external central processing unit (not shown).

INPUT CONTROL

Input select control 410 is alerted by in-adder 310 via either lead POFLO or lead NOFLO in the event the saturation logic circuitry contained in in-adder 310 detects a positive overflow or negative overlow resulting from a summation of message samples. Input select control circuit 410 in response to an active POFLO or NOFLO lead from in-adder 310 directs input select buffer 420, via leads POF or NOF, to select either hard wired digital message PFS or digital message NFS respective to the overflow condition for outputting to bus 450. In this manner, an excessive summed message sample is clamped to an established maximum positive (PFS) or maximum negative (NFS) value prior to storage in accumulator RAM 510 (520).

Mode control bits, CMBT and CMBR, extend from select latch 440 to input select control 410 over leads 444 and 445 respectively for controlling input functions at input select buffer 420 in accordance with the permissions detailed in Table 1.

A weighted binary value of zero-one (01) (broadcast) or one-one (11) (conference) for mode control bits CMBR and CMBT cause the input control circuit 410 to permit, via lead SMD, the summed message sample (SMDAT) from in-adder 310 to be gated through input buffer select circuit 420 to SELDAT data bus 450. This sequence is in accordance with the function of the mode bits since a time slot which is permitted to broadcast has its message sample summed with the message sample contributed by the remaining time slots assigned to the connection.

A time slot which has permission only to monitor a conference connection (CMBR and CMBT=01 respectively) causes input select control 410 to permit via lead PSD previously summed message samples (PSDAT) to be gated through the input select buffer 420 to SELDAT data bus 450. This sequence is in accordance with Table 1 since a time slot having permission only to monitor a conference session is denied permission to transmit to the session.

In the event a time slot has permission only to monitor a conference session, and that time slot is the first time slot of a connection to access accumulator RAM 510 (520) during a time frame, then select control circuit 410 in response to the INIT lead extended from RSB circuit 260 permits, via lead IDLEC, symbolic input IDLECODE (IC), which has a digital value of zero, to be gated through input buffer select circuit 420 to SELDAT data bus 450, rather than PSDAT. This sequence is in accordance with the monitor function since the accumulator RAM 510 (520) memory location assigned to the connection is initialized by loading the message sample from the first accessing time slot, which, for a time slot in the monitor mode is a digital message sample of zero value, into the assigned accumulator RAM 510 (520) memory location. In the event a first accessing time slot is assigned to a host terminal of a multipoint connection or has permission to broadcast then IBDAT is selected for outputting to bus 450 via lead IBD from select circuit 410 to buffer circuit 420.

TABLE 2

| Select Control 410 Input | | | | | OutPut to Bus 450 |
|---|---|---|---|---|---|
| CMBR | CMBT | INIT | POFLO | NOFLO | OUTPUT |
| 0 | 0 | 1 | — | — | IBDAT |
| 0 | 1 | 1 | — | — | IBDAT |
| 1 | 0 | 1 | — | — | IDLECODE |
| 1 | 1 | 1 | — | — | IBDAT |
| 0 | 0 | 0 | 0 | 0 | SMDAT |
| 0 | 1 | 0 | 0 | 0 | SMDAT |
| 1 | 0 | 0 | 0 | 0 | PSDAT |
| 1 | 1 | 0 | 0 | 0 | SMDAT |
| 0 | 0 | 0 | 1 | 0 | PFS |
| 0 | 1 | 0 | 1 | 0 | PFS |
| 1 | 0 | 0 | 1 | 0 | PSDAT |
| 1 | 1 | 0 | 1 | 0 | PFS |
| 0 | 0 | 0 | 0 | 1 | NFS |
| 1 | 0 | 0 | 0 | 1 | PSDAT |
| 1 | 1 | 0 | 0 | 1 | NFS |
| 0 | 1 | 0 | 0 | 1 | NFS |

Table 2 illustrates symbolically, in a format similar to the format of the well-known truth table, the states of inputs to select control 410 that control the selection of corresponding ones of digital inputs to input select buffer 420 for gating to SELDAT bus 450.

INPUT RESET BIT PROCESSING/NON-DATA MODE

Input select buffer 420 appends or changes the reset bit (bit 16) of the seventeen bits of data outputted to bus 450 prior to storage in accumulator RAM 510 (520). The reset bit (bit 16) of a summed message sample is the means by which the first storage access to accumulator RAM 510 (520) is recognized respective to a conference session.

RSB processor circuit 260 is a sequential logic circuit of edge triggered flip-flops for generating reference signal RSB' on lead 261. FIG. 5 shows a symbolic representation of incoming time slots 255 and 0 occurring within three consecutive time frames N, N+1, N+2. FIG. 5 also shows signal RAMSEL0 which is clocked by the second rising edge of clock signal 4F during the fourth quarter of time slot 255. The generation of RAMSEL0 will be detailed further on in this description. FIG. 5 further shows signal RSBI which is internal to RSB processor 260 and which is clocked on the rising edge of clock signal RAMSEL0. Signal RSBI is effectively one-half the frequency of signal RAMSEL0. Signal RSB' is a delayed replica of internal reference signal RSBI and is reclocked in the middle of time slot 0. Signal RSB' is delayed in this manner to ensure that its application by input select buffer 420 occurs sufficiently after the occurrence of time slot 255 so as not to disturb the state of the reset bit during time slot 255.

Returning to FIGS. 2 and 3, RSB processor 260 includes circuitry for comparing the logic state of signal RSB' against bit 16 (Reset bit) inputted via lead 265 for each summed non-data mode message sample placed on PSDAT data bus 311 via accumulator RAM 510 (520) and select latch 620.

Referring to FIG. 5, it should be noted that the logic state of signal RSB' changes every two time frames (N, N+2) during time slot zero. The frequency of signal RSB ensures that the reset bit (bit 16) of each summed non-data mode message sample stored in accumulator RAM 510 (520) tracks the logic state of RSB for two time frames since the accumulators 510 and 520 are alternately loaded between a first and second time frame. Therefore, for time frames N and N+1 (FIG. 5) the reset bit of each summed non-data mode message sample stored in accumulators 510 and 520 correspond to the logic state of signal RSB' during the respective time frames.

During time frame N+2 (FIG. 5) reset signal RSB' is toggled to the logic zero state during time slot zero and remains in that state during time frames N+2 and N+3 (not shown).

To reiterate, bit 16 (reset bit) of each summed non-data mode message sample processed during time frames N and N+1 were set to a logic one corresponding to the state of signal RSB'. The reset bit and summed samples are stored in the accumulator. During time frame N+2, bit 16 of each stored summed message sample (PSDAT) is compared by RSB processor 260 against signal RSB'. If the logic state of bit 16 of a respective summed non-data mode message sample and the logic state of signal RSB' do not compare then the respective time slot must be the first access to accumulator RAM 510 (520) for the respective connection. This follows, since if a prior access for this frame had occurred the stored reset bit would match signal RSB'. RSB processor 260, upon detecting a first access to accumulator RAM 510 (520), causes the INIT lead to input select control 410 to go to the logic one state. In turn, input select control 410, in accordance with Table 2, selects IBDAT or IDLECODE to be gated through input select buffer 420 for storage in accumulator RAM 510 (520) along with RSB' (bit 16). In this manner, a new input message IBDAT respective to the first accessing time slot or IDLECODE (monitor mode) is used to reset the respective assigned accumulator RAM 510 (520) memory location thereby avoiding the necessity of pausing at the beginning of each time frame in order to clear accumulator RAM 510 (520).

If the logic state of bit 16 at 265 of a summed message sample respective to a connection and the logic state of signal RSB' compare then the respective time slot is not the first access in this frame to accumulator RAM 510 (520). In this event, the logic state of the INIT lead is zero and the output from input select buffer 420, under control of input select 420, will be in accordance with Table 2.

This invention can be illustrated by way of example. Referring to FIG. 5, assume that a conference connection comprising three telephone lines are assigned by an external central processing unit to time slots 0, 4 and 8 (4 and 8 not shown) respectively. Also assume that the conference connection is assigned memory location 96 of accumulator RAM 510 (520) for the storage of the connection's summed message samples. Further assume that accumulator RAM 510 is accessed for storage during even time frames (N, N+2), and that accumulator RAM 520 is accessed for storage during odd time frames (N−1, N+1). Also, assume that bit 16 (reset bit) of each summed non-data mode message samples stored in accumulator RAMs 510 and 520 during time frames N−2 (not shown) and N−1 were set to logic zero corresponding to the state of signal RSB'.

In accordance with the outlined assumptions, and with reference to FIGS. 5 and 7, during time slot 255 of time frame N−1 (which precedes time slot 0) the summed non-data mode message samples priorly loaded into location 96 of even accumulator RAM 510 during time frame N−2 (not shown) is prefetched and presented to latch 620 (FIG. 3). At the beginning of time slot 0 of frame N, latch 620 is caused to output the summed message sample to PSDAT bus for summation by in-adder 310 with an incoming message sample (IBDAT) respective to time slot 0. Also, during time frame N, reference signal RSB' is toggled as priorly discussed to logic one state. As noted previously, the toggling of the RSB' signal is delayed to ensure its input at select buffer 410 occurs correctly (i.e., is toggled within a corresponding current frame). Reset bit (bit 16) of a respective summed non-data mode message sample on PSDAT bus is extended to RSB processor 260 via lead 265 for comparision with reference signal RSB. Since the logic state of bit 16 is zero (0) and the logic state of signal RSB' is a one (1) there is a mismatch signifying a first access to memory location 96 of accumulator RAM 510 during time frame N.

The INIT lead to input select control 410 from RSB processor 260 goes to a logic one state as a result of the mismatch and directs either inputted message sample IBDAT or symbolic input IDLECODE to be gated through input select buffer 420 to SELDAT bus 450 for storage in location 96 of accumulator RAM 510 thereby overwriting old data with new data. The reset bit (bit 16) of selected ones of inputs to input select buffer 420 is updated by input buffer 420 circuitry to correspond to the current logic state of signal RSB before outputting to bus 450. In this manner, the reset bit equals signal RSB' after initial access has been recognized by RSB processor 260.

During time slot 3 of frame N the contents of location 96 of accumulator RAM 510 is again prefetched and presented to latch 620. At the beginning of time slot 4 the contents of latch 620 is outputted to PSDAT bus for summation with an incoming message sample respective to time slot 4 by in-adder 310. Bit 16 of PSDAT bus is sampled by RSB processor 260 via lead 265 for comparison against signal RSB'. However, RSB processor 260 in this instance does not detect a mismatch since bit 16 of the summed message sample was changed during time slot 0 by input select control 410 to equal signal RSB'. As such, time slot 4 is not recognized as a first access and the summed message sample SMDAT from in-adder 310 is gated through input select buffer 410 for outputting to bus 450 for storage into location 96 of accumulator RAM 510. The recognition process that was applied to time slot 4 is also applied to time slot 8.

During the next time frame N+1, time slot 0 is recognized as the first access to location 96 of odd accumulator RAM 520.

The recognition of time slot 0 as the first access to location 96 of accumulator RAM 520 is based on the status of bit 16 of the summed non-data mode message sample stored in location 96. The last access to accumulator RAM 520 occurred during time frame N−1 in which the state of signal RSB' was zero. As noted previously, input select buffer 420 (FIG. 2) changes bit 16 to equal the state of signal RSB', which during time slot N−1 was a logic zero. Therefore, RSB processor 260 upon comparing bit 16 of the summed message sample stored in location 96 of accumulator RAM 520 against the state of signal RSB' detects a mismatch. The mismatch, as noted previously, signifies a first access. The processing of time slot zero includes changing bit 16 of summed message sample to correspond to signal RSB' to preclude recognizing time slot 4 and 8 as a first access during the N+1 time frame in the manner described above.

RESET BIT PROCESSING/DATA MODE

Reset bit processing is modified whenever mode control bits CMBT and CMBR extended to RSB processor 260 describe the data mode (00). CMBT and CMBR set to logic zero force RSB processor 260 to compare bit sixteen of PSDAT bus against a fixed reference equal to a logic one rather than varying reference RSB'. This departure from the non-data mode occurs as a result of reset bit processing at the output of conferencer 100 by circuit RSB0 660. As will be explained herein, for the data mode conference connection circuit RSB0 660 detects a first access to accumulator RAM 510, 520 in the supply cycle respective to a connection. Upon detecting a first access, circuit RSB0 causes bit 16 of the summation to be reset to a logic zero and overwrites the summation stored in accumulator RAM 510, 520 with the output from MSG gate 625, which for the data mode is the message sample contributed by the host terminal. As such, the conference summation is distributed to the host time slot and thereafter, during the same frame, the secondary terminal time slots receive the host message sample or broadcast.

Therefore, in order to process the reset bit (bit 16) at the input of conferencer 100 it is necessary to compare bit 16 of PSDAT bus against a fixed reference signal, which for the preferred embodiment of the invention is equal to a logic one.

Gating circuitry within RSB processor 260 normally gates through reference signal RSB' for comparison against bit 16. However, the circuitry gates through a logic one state whenever mode control bits CMBT and CMBR define the data mode. In this instance, a first access to accumulator RAM 510 (520) in the storage cycle respective to a data conference connection is detected whenever bit 16 of PSDAT is a logic zero. A first access is detected since a comparison of bit 16 against the fixed reference results in a mismatch. Upon detecting a mismatch, RSB processor 260 forces lead INIT to a logic one state which directs input select control circuit 410 to selected inputted message sample IBDAT to be gated through input select buffer 420 to SELDAT bus 450 for storage in accumulator RAM 510, 520. As discussed, the gating of message samples through input selector buffer 420 causes bit 16 of the message sample to agree with the logic state of lead RSB'. In the case of the data mode lead RSB' is forced to a logic one state.

After initial input access, bit 16 of PSDAT bus agrees with the fixed reference state of reference signal RSB', and as mentioned, SMDAT is gated through input select buffer 420 respective to the remainder of the data conference connection in accordance with the states outlined in TABLE 2 and as discussed previously.

ACCUMULATOR RAM

Referring to FIG. 3, accumulator RAM 510 and RAM 520 are identical dynamic random access memories each having 128 memory locations of seventeen bits each enabled by 4T clock signals. Summed message samples stored in accumulator RAM 510 (520) memory locations comprise 17 bits as follows: a summed message sample of 14 magnitude bits and a sign bit, a parity bit and a reset bit.

FIG. 4 shows four transitions of clock 4T for each period of a time slot. The first falling edge of clock 4T (A) initiates an accumulator RAM 520 (510) read or prefetch. During the next (first) rising edge (B) of the 4T clock signal the prefetched data is clocked into accumulator RAM 520 (510) output register (internal, not shown). During the second falling edge (C) of the 4T clock signal a summed message sample from PSDAT bus 311 is written into accumulator RAM 520 (510). This sequence is depicted by the AR1AD accumulator RAM 520 address sequence (FIG. 4) respective to time slot 253, which shows that a time slot is divided into two distinct operations, namely, first, prefetching summed message samples respective to a second time slot (254) and second, storing a summed message sample respective to a first time slot (253) during the period in which RAMSEL0 is a logic zero.

TS-255 (TIME SLOT) DETECTOR

TS-255 Detector 455 FIG. 3 detects the occurrence of incoming time slot 255 respective to system frame sync signal TSYNC (FIG. 4), which occurs once each time frame and which overlaps time slots 253 and 254 as a means of signifying an approaching end to a respective time frame. Signal TSYNC applied via lead 230 is toggled and clocked into the first D-type flip-flop of detector 455 on the falling edge of clock signal 2T occurring at the end of time slot 253. TSYNC is then clocked into a second D-type flip-flop of TS detector 455 on the falling edge of clock signal 2T occurring at the beginning of IBDAT time slot 255 and is outputted as signal TS255' on lead 451. Signal TS255' on lead 451 is time representative of incoming time slot 255.

RAM SELECTOR

Accumulator RAM selector circuit 460 is a sequential circuit for generating clock signal RAMSEL0 at least 461 and clock signal LRS0 at lead 463. Clock signals RAMSEL1 and LRS1 at lead 462 and lead 464 respectively are complements of signals RAMSEL0 AND LRS0 respectively.

Clock signals RAMSEL0 and RAMSEL1 at lead 461 and 462 respectively are the means for alternating accumulator RAM 510 (520) between a storage cycle during a first time frame and a supply cycle during a second time frame. Derivative RAM select signal LRS0 outputted at lead 463 to RAM R/W circuit 470 and at a logic one state (high) during a first time frame selects accumulator RAM 510 for storage of summed message samples outputted from input select buffer 420 via SELDAT bus 450. RAM select signal LRS0 at the logic zero state selects accumulator RAM 510 for supplying summed message samples for outputting via data bus 750. RAM select signal LRS1 outputted at lead 464 to RAM R/W circuit 470 and at the logic one state selects accumulator RAM 520 for the storage of message samples and at the logic zero state selects accumulator RAM 510 for supplying summed message samples to lead 750.

Clock signal RAMSEL0 at lead 461 is toggled by the occurrence of signal TS255' extended from TS-255 detector 455 to accumulator RAM selector 460 via lead 451, and the second rising edge of clock signal 4F occurring during time slot 255. In turn, control signal LRS0 is delayed one-quarter of a time slot respective to signal RAMSEL0 and is toggled by the combination of toggled RAMSEL0 and the first rising edge of clock signal 4T. Toggled select signal LRS0 occurs at the start of a time frame coincident with time slot 0. Select signals LRS0 and LRS1 are toggled in this manner following the occurrence of each TSYNC pulse as a means of causing the signals to alternate between a logic one state and logic zero state respectively during a first time frame and a logic zero and logic one state respectively during a second time frame for the alternate selection of accumulator RAM 510 or RAM 520.

RAM INPUT SELECTOR

Referring to FIG. 3, Ram Input Selectors 530, 560, under control of RAMSEL0 and RAMSEL1 leads respectively, select either message samples outputted from input select buffer 420 via SELDAT bus 450 or message samples outputted from MSG gate 625 via bus 650.

As discussed previously, signal RAMSEL0 and its derivative signals cause accumulator RAMs 510, 520 to alternate between a storage cycle and a supply cycle. In the same manner, RAM input selectors 550, 560 are alternatively toggled to extend information contained on SELDAT bus 450 to the input of its corresponding accumulator RAM 510 (520) when that accumulator RAM 510 (520) respectively is in the storage cycle. Conversely, RAMSEL0 and RAMSEL1 cause RAM input selectors 530, 560 to extend the message sample contained on bus 626 to the input of its corresponding accumulator RAM 510 (520) that is in the supply cycle.

As will be explained shortly, a message sample contained on bus 626 is operative only when the accumulator RAM 510, 520 is in the supply cycle, when the respective outgoing time slot is assigned to the data mode, and when that time slot is in the first access to the supply accumulator RAM 510 (520) in the supply cycle. RAM selector circuit 530 (560) upon selecting the 16 bit message sample from bus 620 appends a logic zero to the message sample as bit 16 (reset bit) prior to storage in accumulator RAM 510 (520).

RAM READ/WRITE

Referring to FIG. 4, in particular to time sequence AR1AD, it is shown that each time slot is apportioned into a read (R) cycle for first prefetching a summed message sample respective to a second time slot and a write cycle for storing summed message samples into accumulator RAM 520 respective to a first time slot. Signals RRM0 and RRM1 are the means by which a time slot is apportioned into a read cycle and a write cycle.

Returning to FIG. 3, RAM READ/WRITE circuit 470 is a combinational circuit comprised of AND and NAND gates for generating accumulator RAM 510 (520) READ/WRITE signals RRM0 and RRM1 at leads 471 and 472 respectively. Signals RRM0 and RRM1 at leads 471 and 472 respectively are inverted replicas of clock signal 2T for placing the accumulator RAM 510 (529) in the storage cycle. Select signal LRS0 (LRS1) at the logic zero state and inputted via lead 463 (464) disenables circuitry associated with RAM read/write circuit 470 and forces the output at lead 471 (472) to a logic one state, or RAM read state for the accumulator RAM 510 (520) in the supply cycle. Conversely, select signal LRS0 (LRS1) at the logic one state enables RAM read/write circuitry 470 thereby causing the circuitry to output at lead 471 (472) an inverted replica of clock signal 2T. Since select signals LRS0 and LRS1 are logical complements, either signal RRM0 or signal RRM1, but not both, is enabled during a respective time frame. Read/Write control signals RRM0 and RRM1 also connect to accumulator RAMs 510 and 520 via leads 471 and 472 respectively.

The seven bit accumulator RAM 510 (520) read address (RARAD) and write address (WARAD) extend to accumulator RAM 510 (520) via address bus 515 (525) and via RAM select circuit 540 (550), under the control of signal RRM0 (RRM1).

For example, assume that during a first time frame accumulator RAM 520 is operative for the storage of message samples inputted via SELDAT bus and, concurrently, accumulator RAM 510 is operative for outputting message samples stored during the prior frame respective to each time slot to output 750. In this instance, RRM1, which during the assumed first time frame is an inverted replica of clock 2T, gates read address RARAD through select circuit 550 to accumulator RAM 520 via address bus 525 during the first half of a time slot and gates write address WARAD, via address bus 525, to accumulator RAM 520 during the second half of a time slot. Simultaneously therewith, signal RRM0, which is held constantly at logic 1 during the assumed time frame, gates only read address RARAD through select circuit 540 to accumulator RAM 510 via address bus 515 during the respective time frame.

During the second (next) time frame, signal RRM1 at lead 472 is held at the logic one state for the entire time frame thereby only allowing read address RARAD to be gated through select circuit 550 to accumulator RAM 520 via address bus 525. Concurrently, enabled signal RRM0, having a logic one state during the first half of a time slot and a logic zero state during the second half of a time slot, gates read address RARAD through select circuit 540 during the first half of a time slot and gates through WARAD to accumulator RAM 510 during the second half of the time slot. In this manner each accumulator RAM 510 (520) alternates between a storage cycle and a supply cycle, and permits prefetching a summed message sample respective to a second time slot during a first time slot.

RAM SELECT LATCH

RAM select latch 620 FIG. 3 comprises a seventeen bit array of master-slave D type flip-flops for holding prefetched previously summed message samples outputted from accumulator RAM 510 (520) for summing with a respective incoming message sample (IBDAT) by in-adder 310. RAM select latch 620 alternates under control of the RAMSEL0 clock between receiving summed message samples from accumulator RAM 510 (520). A summed message sample is clocked into the master flip-flops of latch 620 on the second rising edge of the 4F clock and then clocked into the slave flip-flops for outputting to PSDAT data bus 311 on the rising edge of the 4T clock signal during the period in which clock signal LTC is a logic one.

Referring to FIG. 3, RAM select latch 620 receives and latches via data bus 621 summed message samples from accumulator RAM 510 when the RAMSEL0 lead 461 is a logic one and receives and holds via data bus 622 summed message samples from accumulator RAM 520 when RAMSEL0 lead 461 is a logic zero. A summed message sample stored in select latch 620 is presented both to in-adder 310 via bus 311 for summing with an incoming message sample (IBDAT) on bus 206, and to input select buffer 420 as discussed previously.

ADJACENT TIME SLOTS

For the occurrence in which adjacent time slots within a time frame are assigned to the same conference, and, therefore, both are assigned the same accumulator RAM 510 (520) memory location, the summed message samples outputted from input buffer 420 respective to a first one of the adjacent time slots is caused to be loaded by the adjacent time slot detector 480 into select latch 620 in addition to being loaded in accumulator RAM 510 (520). In this manner the summed message samples prefetched in preparation of processing the second one of the adjacent time slots includes the message sample contributed by the first one of the adjacent time slots. Without this arrangement the prefetched sum which is removed from memory during the prior time slot would not include the latest sample contributed by the prior time slot.

Referring to FIG. 3, adjacent time slot detector 480 is a combinational comparator circuit and register circuit for detecting adjacent time slots assigned to the same conference session. Adjacent time slot detector 480 is disabled by signal TS255 which is time representative of incoming time slot 255, inputted via lead 451 from detector 455. Disablement of detector 480 precludes recognition of adjacent time slots across the boundaries of two adjacent time frames, which is the case for time slot 255 and time slot 0.

As discussed previously, accumulator RAM 510 (520) read (prefetch) address RARAD respective to a second time slot occurs simultaneously with accumulator RAM 510 (520) write address WARAD at the output of select latch 440 or address busses 442 and 443, respectively. Therefore, read address (RARAD) respective to a second one of adjacent time slots equals the write address (WARAD) respective to a first one of adjacent time slots occurring simultaneously therewith.

Read address RARAD and write address WARAD extend from select latch 440 to adjacent time slot detector 480 via address busses 442 and 443 respectively. Combinational comparator circuitry associated with detector 480 compares the addresses and outputs a logic one via lead 481 upon detecting a match between addresses RARAD and WARAD. At the beginning of the fourth quarter of the first one of adjacent time slots, the logic one outputted from the comparator circuitry of detector 480 is clocked into a detector 480 output register on the rising edge of clock signal 4F and outputted at 481. Detector 480 output register is cleared by the rising edge of clock signal 4F occurring during the first quarter of the second one of the adjacent time slots given that the next subsequent time slot is not adjacent.

The logic one outputted from detector 480 register extends to latch 620 via lead 481 which forces the summed message sample respective to the first one of adjacent time slots on PSDAT bus 311 to be latched into select latch 620 thereby displacing the prefetched summed digital message samples respective to the second of the adjacent time slots.

RAM OUTPUT LATCH

RAM output latch 630 (FIG. 3) holds prefetched summed message samples outputted from accumulator RAM 510 (520) selected for supplying data to the output 750. RAM output latch 630, which is similar to select latch 620 and which is clocked by the 4F and 4T signals, alternates under control of the RAMSEL1 clock signal at lead 462 between receiving and holding summed message samples from accumulator RAM 510 (520).

When RAMSEL1 clock at lead 462 is a logic one, RAM output latch 630 receives and holds via bus 621 summed message samples from accumulator RAM 510 (520) for outputting to out-adder 640 via the CSDAT data bus 635. RAMSEL1 clock signal at the logic zero state switches the input of RAM output latch 630 to accumulator RAM 520 for receiving summed message samples via data bus 622.

SAMPLE RAM MEMORY

As shown on FIG. 4, time slot address DRAD generated by address generator 320 on bus 319 leads a respective incoming IBDAT time slot by one-half time slot and is applied to the memory address input of sample RAM 610 (FIG. 3) for prefetching a previously stored message sample respective to the incoming time slot of a previous time frame prior to the storage of the incoming digital message sample of a current frame. The 2T clock signal directs the read/write cycle of sample RAM 610 respective to clock signal 4T.

Continuing in FIG. 4, for example, time slot address (DRAD) 254 precedes and overlaps incoming time slot (IBDAT) 254 by one-half time slot and is applied to sample memory RAM 610 via bus 319. The occurrence of clock signal 2T at the logic one state and the second falling transition of clock signal 4T during IBDAT time slot 253 causes memory location 254 to be read and the contents stored in sample RAM 610 output latch (internal, not shown) on the following rising edge of 4T (not shown) for processing by out-adder 640 via message sample gate (MSG) 625. During IBDAT incoming time slot 254, the occurrence of clock signal 2T in the logic zero state and the first falling transition of clock 4T causes a new message sample respective to time slot 254, extended from bus 206, to be stored in memory location 254 of sample memory RAM 610. The prefetched message sample respective to time slot 254 held in sample RAM 610 output latch is then applied to message sample gate 625 via data bus 616 during time slot 254.

MESSAGE SAMPLE GATE

Message sample gate 625 is a 16 bit combinatorial logic circuit under control of sample control circuit 645 for inverting and gating to bus 626 either message samples outputted from sample RAM 610 or digital message IDLECODE, which is internally generated by message sample gate 625.

SAMPLE CONTROL CIRCUIT

Sample control circuit 645 is a combinatorial logic circuit similar to input control circuit 410 for controlling message sample gate 625 in accordance with the permissions established by the logic state of mode control bits CMBT and CMBR inputted at via leads 444 and 445 respectively. Maintenance signals (not shown) are also inputted to sample control circuit 645 for exercising the conferencer.

Sample control circuit 645 selects alternate message IDLECODE to be generated and gated through gate 625 for time slots assigned to the monitor mode. A time slot in the monitor mode has permission to only monitor a conference connection and therefore, message samples transmitted by the respective time slot are not permitted to be operative on the conference summed message outputted at 750.

Sample control circuit 645 is operative for selecting a message sample on bus 616 to be gated through gate 625 to data bus 626 when the logical state of the mode control bits CMBR and CMBT inputted via leads 644 and 645 respective to a time slot is either 01 (broadcast) or 11 (conference). A message sample contributed by a time slot in either the broadcast or conference mode is summed at the input by in-adder 310 with message samples contributed by other time slots assigned to the connection and stored in accumulator RAM 510 (520), and therefore, its message sample is allowed to be operative on outputted message samples. Whereas, a monitoring time slot is silent and its message contribution is not summed by in-adder 310 with the conference summed message sample. Therefore, the message sample of a monitoring time slot is not permitted to be operative on summed message samples supplied to output 750.

OUT-ADDER

Out-adder 640 is a two's complement combinatorial logic circuit similar in circuitry to in-adder 310. Out-adder 640 includes saturation logic circuitry for detecting positive overflow or negative overflow as a result of summing a summed message sample inputted from output latch 630 via data bus 635 with an inverted message sample from gate circuit 625 via bus 626. Since a message sample inputted via bus 626 is an inverted replica of the message sample previously stored in sample RAM 610, it is essentially subtracted by out-adder 640 from the summed message sample inputted via bus 635 by the twos-complement addition. A message sample respective to a time slot is effectively subtracted in this manner from the summed message sample to eliminate its message contribution from the summed message before the summed message sample is outputted to the respective time slot at output 750. This circuit sequence ensures that sidetone is not transmitted to a respective time slot, since sidetone is provided by local telephone apparatus.

Out-adder 640 notifies output select circuit 710 via leads POOR or NOOR in the event either positive or negative overflow occurs as a result of summing an inputted summed message sample from bus 635 with a respective message sample inputted from bus 626.

OUTPUT RESET BIT PROCESSING

Output reset bit processor (RSB0) 660 is a combinational circuit for processing the reset bit (bit 16) associated with each time slot assigned to the data mode, i.e., CMBT and CMBR respectively equal to 00.

As mentioned earlier, circuit RSB0 660 detects the first supply access to accumulator RAM 510, 520 respective to a data mode connection by comparing the logical state of the reset bit (bit 16) of a supplied summed data message samples outputted from RAM output latch 630 against a fixed reference equal to a logical state of zero.

Reset bit processor 260, as discussed, compares bit 16 of a stored summed data message sample against a fixed reference equal to a logical one for each time slot assigned to the data mode. Upon detecting a first access to storage accumulator RAM 510 (520) in the supply cycle, reset bit processor 260 causes bit 16 of data message sample (IBDAT) to be changed to a logical one and causes the data message respective to the first accessing time slot to be stored in accumulator RAM 510 (520) rather than the previously summed data message sample. Therefore, the reset bit extended to circuit RSB0 660 will be a logical one for each first access to supply accumulator RAM 510, 520 respective to a data conference connection.

Circuit RSB0 660 is operative for each time slot assigned to the data mode. Upon detecting a mismatch between bit 16 of bus 635 and a fixed reference of logical zero, circuit RSB0 660 operates to cause the message sample outputted from MSG gate 625 and contained on bus 626 to be stored in the supply accumulator RAM 510, 520 location assigned to the respective data conference connection. As mentioned, the occurrence of a mismatch represents a first access to accumulator RAM 510 (520) in the supply cycle and indicates that the respective time slot is assigned to the host station of a multipoint data connection. In this instance, circuit RSB0 660 permits normal output processing of the summed data message sample (DFDAT) for transmission to the host time slot via TSI 900.

Upon detecting a mismatch during the host time slot, circuit RSB0 660 forces lead WBN extended to RAM read/write circuit 470 to the logic one state for the duration of the time slot, which in turn forces leads RRM0 and RRM1 to place accumulator RAMs 510, 520 in the write state as discussed previously. Lead WBN does not affect the accumulator RAM 510 (520) in the storage cycle since that RAM is in the write state for the duration of the respective time slot and frame. Lead WBN affects only the accumulator RAM 510 (520) in the supply cycle and only affects that RAM for the duration of the respective host time slot.

As mentioned, RAM input selector 530 (560) extends bus 626 to the input of accumulator RAM 510 (520) in the supply cycle and appends a logic zero to the message sample selected from bus 626 as bit 16. Therefore, during the fourth quarter of the host time slot, as previously described in connection with clock signal 4T, the data message sample respective to the host time slot and contained on bus 626 along with bit 16 and parity bit 17 (not shown) is caused to be stored in the supply accumulator RAM 510 (520) in the respective data conference location. Subsequent accesses to that memory location during the respective supply cycle by secondary time slots will not cause RSB0 660 to detect a mismatch. A mismatch fails to occur on subsequent accesses since selector 530 (560) forced bit 16 to a logical zero which agrees with the fixed reference of logical zero used by RSB0 660. Upon detecting a match, circuit RSB0 660 directs output control circuit via the INITO lead 661 to cause CSDAT to be outputted by output select buffer 720 rather than the difference message sample (DFDAT).

For a multipoint data connection the summation of data samples accepted from each data station less the contribution made to the summation by the host terminal is transmitted to the host terminal via TSI 900. Thereafter, during the same supply frame, the message sample accepted from the host terminal is stored in the supply accumulator RAM 510 (520) and transmitted to each secondary leg of the multipoint connection. In this manner, the secondary legs are isolated from each other and, therefore, only receive broadcasts from the host terminal. On the other hand, the host terminal receives data from each secondary leg of the respective multipoint connection.

To achieve isolation, general purpose conferencer 100 via RSB0 circuit 660 causes the output from RAM latch 630 (the host message sample) to be selected by selector 720 since the output from out adder 640 is an invalid data message sample. The output (DFDAT) from out adder 640 is invalid only respective to time slots assigned to secondary legs of a multipoint data connection, since out adder 640 effectively subtracts the data message sample respective to a secondary data time slot from the message sample accepted from the host terminal making the output from that circuit 640 invalid. Hence, out adder 640 is essentially inhibited during the occurrence of secondary time slots respective to the same conference connection.

OUTPUT BUFFER

Output select buffer 720 is a combinatorial logic circuit similar in circuitry to input select buffer 420, and is under control of output control circuit 710. Output select buffer 720 includes circuitry (not shown) for generating parity (not shown) over selected inputs outputted to output buffer 735 via data bus 734, and includes combinatorial circuitry for performing circuit maintenance functions (not shown) at the direction of an external central processing unit (not shown).

Inputs DFDAT and CSDAT to output select buffer 720 represent respectively the output from out-adder 640 via bus 641 and the output from latch 630. CSDAT is the cumulative conference message sample from accumulator RAM 510 (520) and includes the message sample contribution of the respective time slot. DFDAT is the cumulative conference message sample less the message sample contribution of the respective time slot. Alternate digital messages PMAX, NMAX and IDLECODE are also generated internally by output buffer 720 and were defined previously. Output select buffer 720 generates additional alternate digital messages (not shown) in response to circuit maintenance requests.

OUTPUT CONTROL CIRCUIT

Output control circuit 710 is a combinational logic circuit similar in circuitry to input control circuit 410 for controlling the outputting of selected ones of inputs to output select buffer 720. The outputs from output select control 710 correspond to respective inputs to output select buffer 720.

TABLE 3

| Output Select Control Input | | | | | Output to |
|---|---|---|---|---|---|
| CMBR | CMBT | POOR | NOOR | INITO | Bus 734 |
| 0 | 0 | — | — | 0 | DFDAT |
| 0 | 0 | — | — | 1 | CSDAT |
| 0 | 1 | — | — | — | IDLECODE |
| 1 | 0 | 0 | 0 | — | DFDAT |
| 1 | 1 | 0 | 0 | — | DFDAT |
| 1 | 0 | 0 | 1 | — | NMAX |
| 1 | 0 | 1 | 0 | — | PMAX |
| 1 | 1 | 0 | 1 | — | NMAX |
| 1 | 1 | 1 | 0 | — | PMAX |

Table 3 illustrates symbolically, in a format similar to the format of the well-known truth table, the states of inputs to output select control 710 which in turn control the selection of corresponding ones of inputs to output buffer 720 for gating to bus 734.

In response to a positive or negative overflow signal from out-adder 640, via leads POOR or NOOR respectively, output select control circuit 710 directs output select buffer 720, via leads PFS and NFS respectively, to output alternate digital messages PFS (PMAX) or NFS (NMAX) to bus 734 respectively. IDLECODE is outputted by output buffer 720 at the direction of output select control circuit 710 via lead IDLC whenever the respective time slot has permission only to broadcast (mode control bits=01) to a conference session. IDLECODE is selected for outputting in accordance with Table 3 in this instance to ensure that a respective broadcast only time slot does not receive digital message samples from the conference session. Output select control 710 directs, via lead DFD, output buffer 720 to gate through the output (DFDAT) from out-adder 640 extended to output buffer 720 via DFDAT data bus 641, to respective time slots having permission to receive (CMBR=1) summed message samples from the conference session in the absence of overflow.

OUTPUT BUFFER

Output select buffer 720 extends the selected digital message sample to output buffer 735 via bus 734.

Output buffer 735 is a sequential circuit arrangement of master-slave flip-flops in which data on bus 734 is clocked into the master stage of output buffer 735 on the falling edge of the 4T clock within the LTC enable window; the contents of the master register is clocked into the slave register on the first rising edge of clock signal 4T within the LTC enable window for outputting to sixteen parallel bit bus 750.

The progression of a digital message sample through output latch 735 is arranged in accordance with clock signal 4T to allow an outputted message sample to be available for the full period of a time slot, instead of a portion of a time slot. Therefore, in accordance with this arrangement, an outputted message sample via data bus 750 lags the incoming (next) time slot (IBDAT) by one time slot. For example, a summed message sample respective to time slot 254 is available at output 750 at the start of input time slot 255.

A substitution of the master-slave register arrangement with standard flip-flops permits the output to be available via data bus 750 during the respective time slot.

CONCLUSION

It is obvious to one skilled in the art that the invention disclosed herein is not limited to the embodiment disclosed in the accompanying drawings and foregoing detailed description, but can be rearranged through the substitution, addition and/or deletion of components and functions without departing from the scope and spirit of the invention.

For example, the arrangement of various data busses can be rearranged by adding or deleting the number of bits which define the digital value of summed message samples. In turn, the accumulator RAMs and sample RAM can be adjusted to reflect the corresponding change in the number of data bits. Further, the number of mode control bits can be easily redefined from what is disclosed herein or can easily be increased in number to define hybrid connections or other functions, such as the insertion of a delay between outputting particular summed message samples. Moreover, alternative symbolic messages can be readily changed to different values without departing the scope and spirit of the invention disclosed herein. Still further, the interface circuit can be readily changed from a serial input to a parallel input which is well known in the art.

The linear time division multiplexed switching arrangement disclosed would typically include maintenance functions to perform audits and diagnostics on the circuit elements. The circuit would also typically include arrangements for making parity checks and for appending a parity bit to data. While these maintenance functions are high desirable, their implementation is well known to the art.

What is claimed is:

1. A system for accepting message samples at an input, said message samples arriving in time slots within a frame, said system comprising means for selectively summing said message samples of groups of said time slots, first storage means having a plurality of memory locations for storing each said summed message samples during a first time frame and for supplying said stored summation during a next second time frame, second storage means having a plurality of memory locations for storing each said summed message samples accepted during said next second time frame and for supplying said stored summation during a next third time frame, and control means operative for supplying said summed message samples respective to a group of time slots to the first occurring time slot of that group of time slots and for supplying the message sample of said first time slot to the other time slots of said respective group of time slots.

2. The invention set forth in claim 1 further comprising means for selectively interchanging time slots at a system input with alternate time slots and interchanging said alternate time slots back to said first mentioned time slots at a system output and for supplying said message samples at said system output.

3. The invention defined in claim 1 wherein said control means includes means for generating a first fixed reference signal, means for appending to said summed message samples a unique bit agreeing with the state of said first reference signal, means for generating a second fixed reference signal, means for selectively changing said appended bit to agree with the state of said second fixed reference signal, first comparison means for comparing said changed appended bit of particular ones of said summed message samples and said first reference signal, and second comparison means for comparing said appended bit of particular ones of priorly summed message samples and said fixed second reference signal.

4. The invention defined in claim 3 wherein said second reference signal is the complement of said first reference signal.

5. The invention defined in claim 3 wherein said control means is operative when said appended bit and said second fixed reference signal disagree and when said appended bit and said first fixed reference signal disagree.

6. The invention defined in claim 1 wherein said control means is further operative for processing a plurality of mode bits associated with each of said time slots, said mode bits being indicative of the type of conference connection associated with a time slot.

7. A conferencing system for accepting digitized voice or data message samples at an input, said message samples arriving in time slots within a frame, said system comprising means for conferencing message samples accepted from groups of said time slots during a first frame and for supplying said conferenced message samples to a conference output during a second supply frame, and control means operative when said conferenced message samples are being supplied to said conference output for supplying said conferenced message samples respective to a group of time slots to the first occurring time slot of that group of time slots and for supplying a message sample accepted from said first occurring time slot to other time slots of said group of time slots in place of said respective conferenced message samples.

8. The invention defined in claim 7 further comprising first interchanger means for selectively interchanging particular ones of said time slots with alternate time slots and second interchanger means for interchanging said alternate time slots back to said first mentioned time slots and for supplying said conferenced message samples at a system output.

9. The invention defined in claim 7 wherein said control means includes means for generating a first reference signal, means for appending to said conferenced message samples a unique bit agreeing with the state of said first reference signal, means for generating a second reference signal means for changing said unique bit to agree with the state of said second reference signal, first comparison means for comparing said first reference appended bit of said supplied conferenced data message samples and said second reference signal, and second comparison means for comparing said first reference appended bit of said conferenced voice message samples and a new first reference signal and for comparing changed appended bit of said conferenced data message samples and a fixed state of said first reference signal.

10. The invention defined in claim 9 wherein the logical state of said second reference signal and the logical state of said fixed first reference signal are complements of each other.

11. The invention defined in claim 9 wherein said control means is operative when said second reference signal or said fixed state of said first reference signal and said appended bit of said conferenced data message samples disagree.

12. The invention defined in claim 7 wherein said control means is further operative for processing a plurality of mode bits associated with each time slot, said mode bits being indicative of the type of conference connection associated with a time slot.

13. The invention defined in claim 12 wherein said control means is operative when said mode bits are indicative of the data mode.

14. A linear time division multiplexing system for accepting voice and/or data message samples, said message samples arriving in time slots within a frame, said system comprising first time slot interchanger means for selectively interchanging particular ones of said time slots with alternate time slots, a conferencing circuit, said conferencing circuit including means for selectively summing said message samples from groups of said time slots, first memory means having a plurality of memory locations for storing each said summed message samples accepted during a first time frame and for supplying said summed message samples during a next second time frame, second memory means having a plurality of memory locations for storing each said summed message samples accepted during said next second time frame and for supplying said summed message samples during a next third time frame, means for recognizing the occurrence of a first access to said first or second memory means when supplying summed message samples to a particular group of time slots, and means controlled by said recognizing means for controlling the storage and supply of said summed message samples respective to said particular group of time slots, said system further comprising second time slot interchanger means for selectively interchanging said alternate time slots back to said first mentioned time slots.

15. The invention defined in claim 14 wherein said recognizing means includes means for generating a first reference signal, means for appending to said stored summation a unique bit agreeing with the state of said reference signal, means for generating a second reference signal, means for appending to said supply message samples a unique bit agreeing with the state of said second reference signal, first means for comparing said supply message sample and said second reference signal, and second means for comparing said stored message samples and said first reference signal.

16. The invention defined in claim 15 wherein said controlling means is operative for the storage and supply of said summation when said unique bit and said first reference signal disagree for directly storing in said supply means a message sample respective to a unique first accessing supply time slot.

17. The invention defined in claim 14 wherein said recognizing means includes means for distinguishing voice message samples from data message samples.

18. A circuit for processing received message samples, said message samples arriving in associated time slots within successive frames, individual ones of the time slots within each frame being associated with a respective group of said individual time slots within that frame, said circuit comprising, storing means operative in each frame for storing a sum associated with said group, and supplying means operative in each frame for supplying to an output a priorly stored sum associated with said group, said supplying means being further operative for determining the first occurring time slot of said group, supplying said associated priorly stored sum to said output during said first time slot and supplying the message sample in said first time slot to said output during the other time slots of said group.

* * * * *